United States Patent [19]

Timmons

[11] 4,244,667

[45] Jan. 13, 1981

[54] BORING TOOL

[75] Inventor: Russell M. Timmons, Lutherville, Md.

[73] Assignee: Black & Decker Inc., Newark, Del.

[21] Appl. No.: 79,857

[22] Filed: Sep. 28, 1979

[51] Int. Cl.[3] .............................................. B23B 51/00

[52] U.S. Cl. .................................... 408/201; 408/213; 408/214; 408/225; 408/226

[58] Field of Search ............... 408/113, 200, 202, 201, 408/208, 209, 212, 213, 223, 224, 225, 226, 227, 228, 229, 230, 231, 233, 713, 214

[56] References Cited

U.S. PATENT DOCUMENTS

| | | | |
|---|---|---|---|
| 450,908 | 4/1891 | Brede | 408/213 |
| 1,140,988 | 5/1915 | Kunitz | 408/233 |
| 2,643,692 | 6/1953 | O'Brien | 145/126 |
| 3,165,131 | 1/1965 | Mackey | 408/231 |
| 3,945,753 | 3/1976 | Byers | 408/201 |
| 4,090,807 | 5/1978 | Stewart | 408/203 |
| 4,108,567 | 8/1978 | Faber | 408/226 |
| 4,134,706 | 1/1979 | Stewart | 408/213 |

*Primary Examiner*—Harrison L. Hinson
*Attorney, Agent, or Firm*—Leonard Bloom; Edward D. Murphy; Harold Weinstein

[57] ABSTRACT

A boring tool of the self-feeding type is disclosed which includes a plurality of cutting members secured to a body and a self-feeding member operative to draw the boring tool into the workpiece. The cutting elements are positioned on the body in such a manner as to provide a depth of cut correlated to the rate of advancement effected by the feed member thereby insuring smooth even efficient cutting action of the boring tool. Additionally, the body is provided with a work engaging surface portion operative to further insure controlled even advancement of the boring tool through the workpiece. A retaining member is also provided in the body member which is operative to retain a one piece feed membershank within the body and to maintain the self-feeding member in close proximity to an adjacent cutting member so as to prevent wrapping of wood fibers or the like about the self-feeding member.

17 Claims, 6 Drawing Figures

FIG. 1.
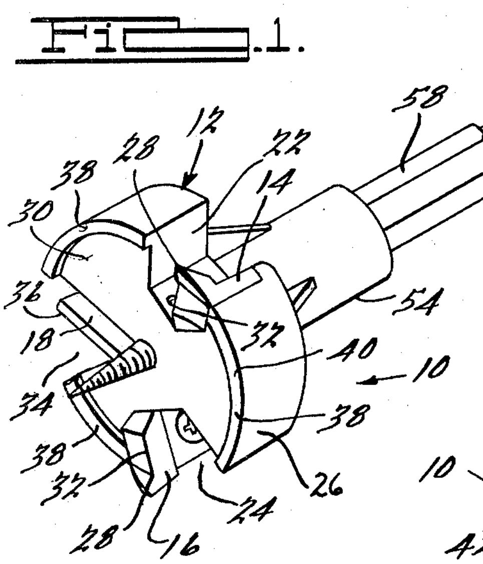
FIG. 2.
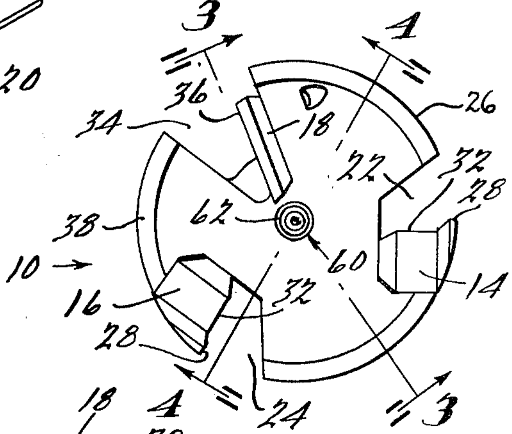
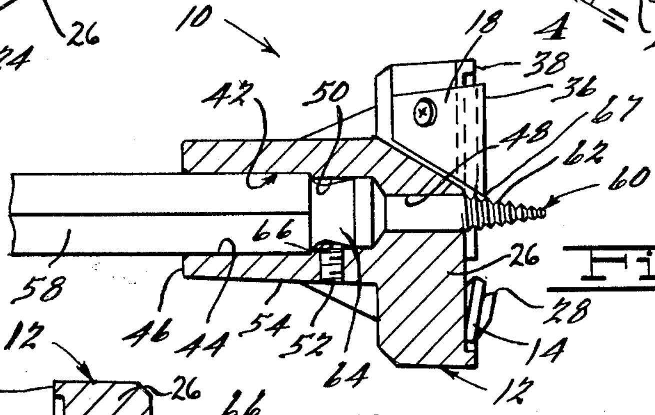
FIG. 3.
FIG. 4.
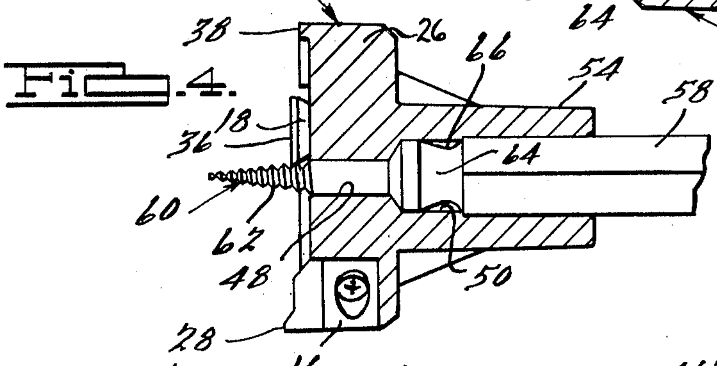
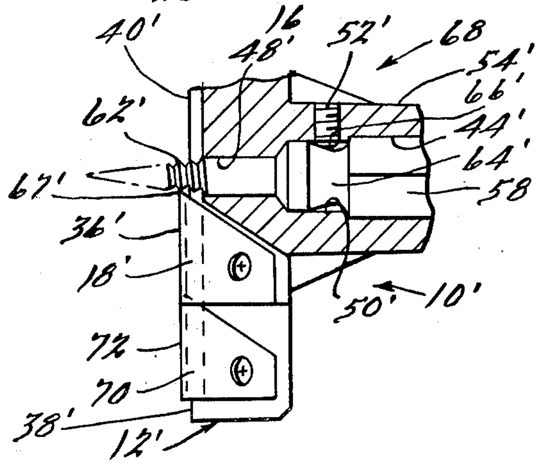
FIG. 5.
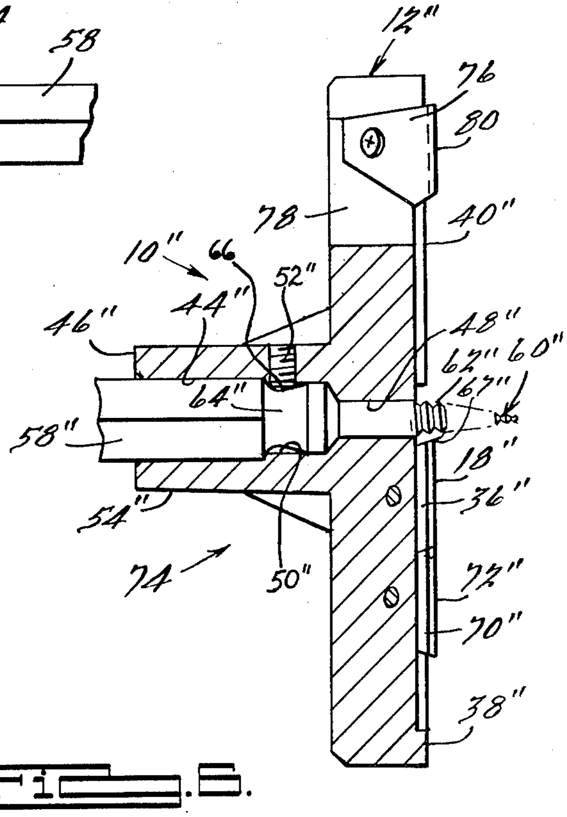
FIG. 6.

BORING TOOL

BACKGROUND AND SUMMARY OF THE INVENTION

The present invention relates generally to boring tools and more particularly to self-feeding boring tools adapted for machining relatively large diameter holes in wood or like materials.

The boring tool of the present invention comprises a body having a driving shaft associated therewith, a plurality of cutting elements secured to and projecting forwardly from one side of the body and threaded self-feeding means operative to advance the boring tool into and through the workpiece. The cutting depth of the cutting elements is proportioned to the pitch of the threads of the self-feeding means in such a manner that a continuous feed of the self-feeding means into the workpiece occurs. In the absence of such a proportioned relationship, the self-feeding means would undergo a cyclical movement alternating between feed and shearing action as it advances into the workpiece. Accordingly, by proportioning the cutting depth of the cutting elements to the pitch of the threads of the self-feeding means, excessive axial loading on the self-feeding means is substantially reduced or eliminated. Also, the proportioning of the cutting depth will insure that both the cutting elements and the self-feeding means operate in unison to provide substantially the same rate of feed, and thus the power required to rotationally drive the boring tool will be reduced.

Additionally, the boring tool of the present invention also provides a peripheral curb portion adapted to engage the work surface and provide a sled running effect to further limit any tendency of the cutting elements to increase the feed rate of the tool as well as to assist in preventing sudden breakthrough as the boring tool approaches the backside of the workpiece.

Also, in order to further enhance the cutting action of the present invention, the retaining means for securing the body to the associated driving shaft is positioned so as to urge the self-feeding means into close proximity with an adjacent cutting element thereby reducing the possibility that uncut fibers may become lodged between the cutting element and self-feed means and thereby impair or otherwise hamper advancement of the boring tool through the workpiece.

Additional advantages and features of the present invention will become apparent from the subsequent description and the appended claims taken in conjunction with the accompanying drawings.

BRIEF DESCRIPTION OF THE DRAWINGS

FIG. 1 is a perspective view of a boring tool in accordance with the present invention;

FIG. 2 is a bottom plan view of the boring tool shown in FIG. 1;

FIG. 3 is a sectioned view of the boring tool of FIG. 2, the section being taken along line 3—3 thereof;

FIG. 4 is a sectioned view of the boring tool of FIG. 2, the section being taken along line 4—4 thereof;

FIG. 5 is a fragmentary sectioned view similar to that of FIG. 3 but illustrating another embodiment of a boring tool in accordance with the present invention; and FIG. 6 is a sectioned view also similar to that of FIG. 3 but illustrating yet another embodiment of a boring tool in accordance with the present invention.

DESCRIPTION OF THE PREFERRED EMBODIMENT

Referring now to the drawings and in particular to FIGS. 1 through 4, there is shown a boring tool in accordance with the present invention indicated generally at 10 and comprising a body 12 having a pair of spur cutters 14 and 16 and a planer blade 18 secured thereto in circumferentially spaced relationship and a shaft 20 extending therethrough.

Spur cutters 14 and 16 are each secured within circumferentially spaced radially outwardly opening cutout portions 22 and 24 respectively provided on a generally cylindrically shaped blade carrying portion 26 of body 12. Spur cutters 14 and 16 are substantially identical and each includes a spur 28 projecting axially outwardly from surface 30 of blade carrying portion 26 which is operative to machine the outer periphery of a hole to be formed by boring tool 10 in a workpiece and a radially inwardly extending cutting edge 32 also operative to remove material from the workpiece. As shown, spur 28 extends axially outwardly from surface 30 a substantially greater distance than cutting edge 32 so as to insure the outer periphery of the material being severed and that the hole thus formed will have a relatively smooth sidewall surface.

It is noted that the boring tool 10 rotates in the counter-clockwise direction when viewed as in FIG. 2 so that spur-cutter 14 is the leading spur-cutter and spur cutter 16 is the trailing spur-cutter. The trailing spur-cutter 16 is seated in carrying portion 26 so as to project further above the surface 40 of curb portion 38 than the lead spur cutter 14. The difference in elevation between the cutting edges 32 of the two spur cutters is arrived at empirically for a particular cutting tool 10 of a given diameter and is selected to help achieve a balancing of the cutting load on the entire tool by making the chip loads which the respective spur-cutters encounter approximately the same. This difference in elevation can be up to approximately twenty (20%) percent of the cutting depth of the cutting edge 32 above the surface 40 of curb portion 38; however, this difference in elevation has no material effect on the proportioned relationship discussed hereinafter between the pitch of the feedscrew thread and the cutting depth of the cutting elements, namely: the spur cutters 14 and 16 and the planer blade 18.

Planer blade 18 is secured within a third cutout portion 34 provided in blade carrying portion 26 which is circumferentially spaced from cutout portions 22 and 24. Planer blade 18 also includes a substantially straight cutting edge 36 extending in a generally radial direction and projecting axially outwardly from surface 30 a distance substantially equal to the distance between surface 30 and cutting edges 32 of respective spur cutters 14 and 16.

Preferably, spur cutters 14 and 16 and planer blade 18 will be relatively positioned and secured to body portion 12 in the same manner as set forth in copending application of Richard E. Walton, II having Ser. No. 079,858 filed on the same date as the instant application and entitled "Boring Tool" which application is assigned to the same assignee as the present application, the disclosure of which is hereby incorporated by reference.

Blade carrying portion 26 of body 12 is also provided with an annular curb portion 38 extending around the periphery thereof and projecting axially outwardly from surface 30 thereof. Preferably, outer surface 40 of curb portion 38 will be machined so as to lie in a plan substantially perpendicular to the axis of rotation of body 12.

Body 12 also is provided with a bore 42 extending axially therethrough and positioned coaxially with the axis of rotation thereof through which shaft 20 extends. Bore 42 includes a non-circular portion 44 extending inwardly from end portion 46 of body 12 and is preferably of a hexagonal shape in cross section. A relatively small diameter section 48 of bore 42 extends inwardly from surface 30 of blade carrying portion 26 and is connected to non-circular portion 44 by an intermediate diameter portion 50. A set screw 52 is provided extending radially through sidewall 54 of body portion 12 and into portion 50 of bore 42.

Shaft 20 includes an end portion 54 of generally circular cross section which is provided with a plurality of substantially equally spaced axially extending flats 56 adapted to be engaged by the jaws of a drill motor chuck so as to prevent relative rotation therebetween and thus insure full driving torque is transmitted from the drill motor to shaft 20. An intermediate portion 58 of shaft 20 has a non-circular and preferably hexagonal cross sectional shape of a size to be received within non-circular portion 44 of bore 42 and is operative to prevent relative rotation between shaft 20 and body 12.

Self-feeding means are provided on the opposite end portion 60 of shaft 20 and comprises a generally conically shaped portion provided with a helical thread 62 of substantially constant pitch. As shown, end portion 60 of shaft 20 projects axially outwardly from surface 30 of blade carrying portion 26 a substantial distance and is designed to engage the workpiece with self-feeding helical thread 62 being operative to form a threaded engagement therewith and thereby draw boring tool 10 into and through the workpiece at a desired feed rate directly proportioned to the pitch thereof.

Shaft 20 also includes an enlarged diameter portion 64 disposed between portion 58 and 60 which is received within portion 50 of bore 42. Portion 64 includes an annular groove 66 adapted to be positioned in radial alignment with set screw 52 when shaft 20 is fully inserted into bore 42 and is cooperable therewith to maintain shaft 20 and body 12 in assembled relationship. It should be noted that set screw 52 is positioned to engage shaft 20 on the side approximately opposite planer blade 18 and thus will operate to urge shaft 20 and end portion 60 into close proximity with the radially inner edge 67 of planer blade 18 thereby insuring more complete efficient cutting action of the boring tool and also serving to prevent fibers or other portions of the workpiece from becoming lodged therebetween and/or wrapping around self-feeding threads 62 and possibly interfering with or otherwise impairing the advancement of boring tool 10 through the workpiece.

It should also be noted that the cutting depth of each of the cutting edges 32 of spur cutters 14 and 16 and cutting edge 36 of planer blade 18 is substantially equal to the axial dimension between surface 40 of curb portion 38 and respective edges 32 and 36 which dimensions will all be substantially equal. The pitch of self-feeding helical threads 62 will also be selected so as to be substantially equal to this cutting depth thereby enabling the cutting edges 32 and 36 to work in substantially synchronized relationship with helical threads 62 so as to insure a constant smooth even feed rate and to reduce or eliminate any tendency of threads 62 to shear or strip the engaged workpiece material during a boring operation.

Additionally, it should be noted that the presence of surface 40 of curb portion 38 also performs a feed rate limiting function via a sled running effect due to engagement of surface 40 with the surface of the workpiece. This curb portion will thereby tend to limit any tendency of the cutting edges to dig into the workpiece surface or otherwise try to increase the feed rate. Further, this curb portion 38 also substantially limits or prevents sudden breakthrough as the boring tool approaches the backside of the workpiece thereby reducing the likelihood of damage to the back-side of the workpiece.

Referring now to FIG. 5, another embodiment of a boring tool in accordance with the present invention is shown being indicated generally at 68. Boring tool 68 is substantially identical to boring tool 10 above although designed to cut a larger diameter opening and accordingly corresponding portions thereof are indicated by like numbers primed. In order to machine a larger diameter opening, a second planer blade 70 is provided which is substantially identical to planer blade 18 and includes a cutting edge 72 positioned an axial distance from surface 40' of curb portion 38' substantially equal to the pitch of helical threads 62'. As shown, planer blade 70 is secured to body 12 at position so as to slightly overlap planer blade 18 to thereby insure substantially complete cutting action. The operation of boring tool 68 is substantially identical to that of boring tool 10 described above.

An even larger diameter boring tool 74 is shown in FIG. 6 which also is substantially identical to boring tools 10 and 68 and accordingly corresponding portions thereof are indicated by like numbers double primed. However, boring tool 74 has a third planer blade 76 secured to body 12'' within cutout portion 78 so as to enable it to machine even larger diameter openings in a workpiece. Planer blade 76 also includes a cutting edge 80 positioned at a distance from surface 40'' of curb portion 38'' substantially equal to both the pitch of helical threads 62'' and the cutting depth of the spur cutters and other planer blades. Therefore, the operation and functions of the various elements of boring tool 74 will be substantially identical to that described above with each of the cutting elements being positioned so as to synchronize the feeding action of both the self-feeding means and cutting elements.

Thus, the boring tool of the present invention provides a substantially improved efficient smooth feed rate which reduces the likelihood of stripping of the self-feeding threads by correlating the cutting depth of each of the cutting elements to the pitch of the self-feeding means. Additionally, clean full cutting action is insured by positioning the set screw substantially opposite the most radially inwardly disposed planer blade so as to urge the self-feeding portion into close proximity therewith.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. In a boring tool for boring relatively large diameter openings in a workpiece comprising a body, a driving